United States Patent Office 3,322,235
Patented May 30, 1967

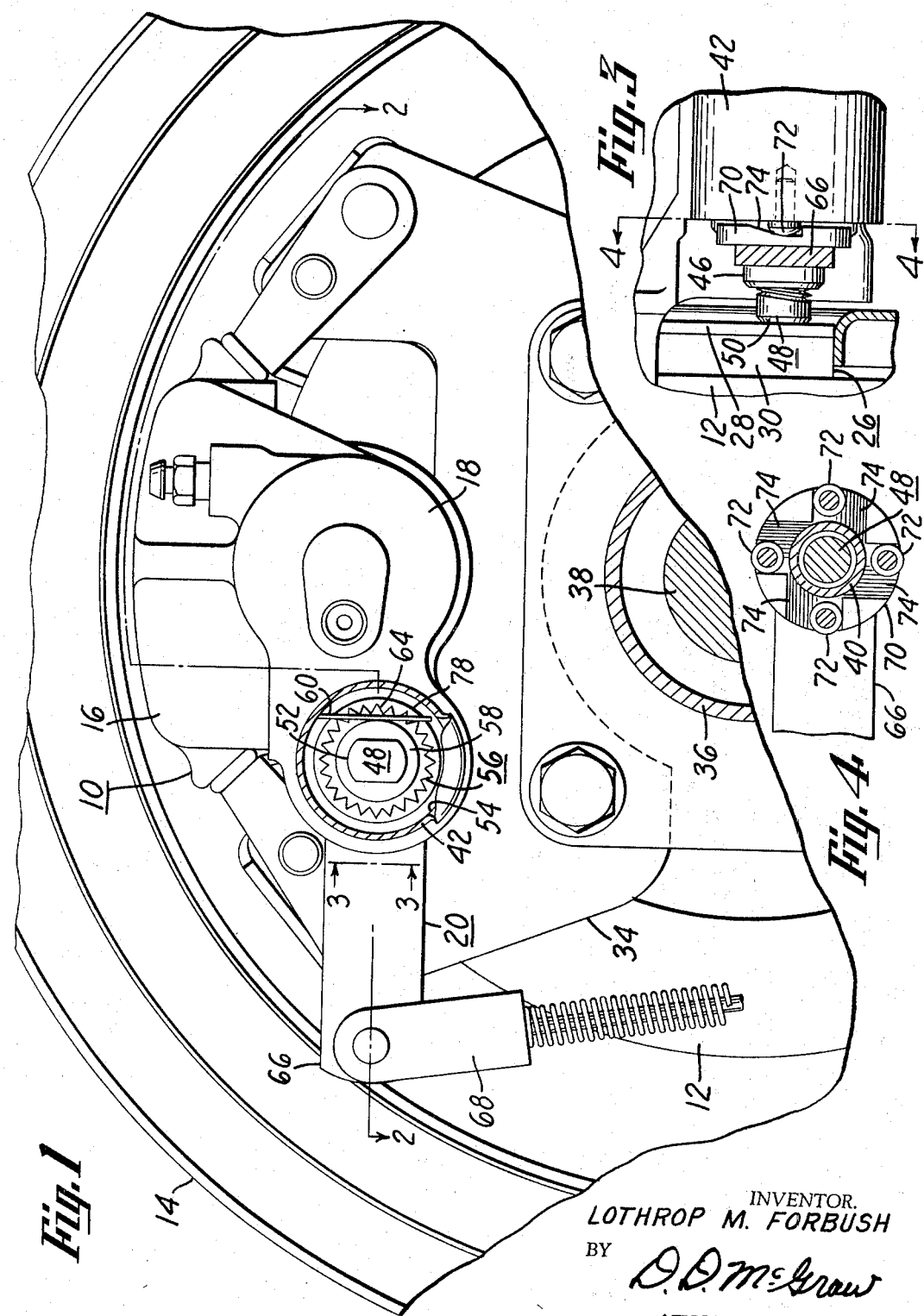

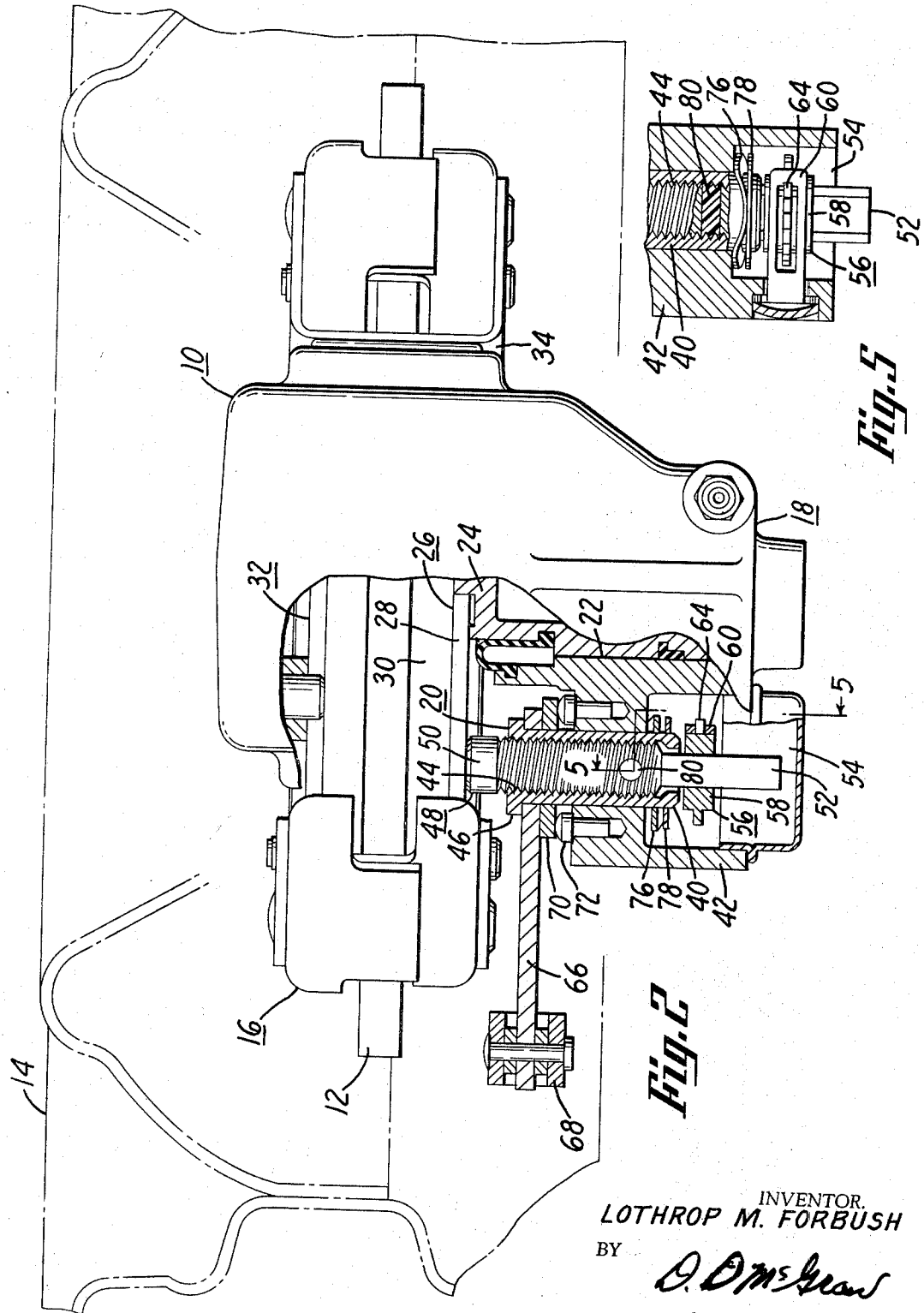

3,322,235
SELF-ADJUSTING DISC BRAKE
Lothrop M. Forbush, Birmingham, Mich., assignor to General Motors Corporation, Detroit, Mich., a corporation of Delaware
Filed Feb. 14, 1966, Ser. No. 527,303
7 Claims. (Cl. 188—73)

The invention relates to a disc brake having a brake actuating mechanism which is self-adjusting, and more particularly to one having a primary brake actuator and a secondary brake actuator, the primary brake actuator being the service brake and the secondary brake actuator being a mechanically applied self-adjusting parking or emergency brake. The preferred embodiment of the invention is herein disclosed as being in a disc brake having a disc and a caliper and a movable brake shoe, the caliper being of the floating caliper type and the brake shoe being actuated by a hydraulic cylinder located in the caliper on one side of the disc, and a complementary brake shoe secured to the caliper and positioned on the other side of the disc. A mechanically controlled and energized secondary brake actuator permits the brake to be energized either for parking purposes or upon failure of the hydraulic system. The invention particularly relates to this secondary brake actuator and its self-adjusting features.

The mechanism includes a bushing, rotated by a lever, mounted in the brake caliper, with the axis of rotation of the bushing being parallel to the axis of rotation of the disc to be braked, and so mounted that the bushing is advanced axially a predetermined amount per degree of rotation. The mounting to accomplish this advance may be by steep lead threads, or helical splines in the bushing periphery, a cam track or tracks, or by a cam arrangement integral with or secured to a shoulder of the bushing in the end toward which it advances, the cams engaging cooperative cam guides or followers secured to or on the caliper. The embodiment illustrated and described in detail below uses the cam and cam follower arrangement. The bushing is internally threaded so that the lead of the thread helix is of the same hand as the lead of the rotating advance means, such as the cam and follower arrangement at the end of the bushing. However, the lead of the internal thread of the bushing is less than the lead of the external actuating mechanism. A threaded rod, threaded with the bushing internal threads, extends through and beyond the bushing so that one end of the rod presses against the movable disc brake pad assembly when the bushing is advanced by rotation in one direction. In addition to the relative leads of the rotating advance means and the threads, means may be provided which interconnect the bushing and rod in drive relation and which under some circumstances will permit relative movement therebetween. A controlled friction means is preferably utilized and may be constructed as a plug of resilient material mounted in a passage extending normally to and through the axis of the rod and pressing against the internal bushing threads. A ratchet mechanism is provided in association with the rod and the caliper housing so that the ratchet permits rotation of the rod in the brake apply direction but will permit only limited rotation of the rod in the brake release direction. When the rod release rotation limit is exceeded, the rod is held by the ratchet against further rotary movement while the bushing continues to be rotated in the brake release direction. Since the bushing cam arrangement is on a steeper helix than the rod threads, the rod will still be retracted axially, but by a lesser amount than the bushing. Thus each time the angular motion required of the bushing to actuate the brake exceeds the rotary limitation of the ratchet, the rod is advanced and the brake mechanism is adjusted. Subsequently the rod and bushing do not move relative to each other until the angular motion of the bushing again exceeds the rotary limitation set by the ratchet.

The secondary brake actuator mechanism embodying the invention rotates to apply the brake and rotates in the reverse direction to retract, with adjustment taking place by differenial rotation of the two concentric elements. The inner or center element presses against the back of the brake shoe but is not secured thereto, thereby permitting its rotary advancing and retracting movement.

In the drawings:

FIGURE 1 is an elevation view of a disc brake embodying the invention, with parts broken away and in section.

FIGURE 2 is a plan view of the brake mechanism of FIGURE 1 taken in the direction of arrows 2—2 of that figure with parts being broken away and in section.

FIGURE 3 is a partial section view of the brake actuator mechanism embodying the invention as taken in the direction of arrows 3—3 of FIGURE 1.

FIGURE 4 is a partial section view of the mechanism illustrated in FIGURE 3 and taken in the direction of arrows 4—4 of that figure.

FIGURE 5 is a partial section view of another part of the brake actuator mechanism and is taken in the direction of arrows 5—5 of FIGURE 2.

The brake assembly 10 includes a disc 12 mounted to rotate with a wheel 14 of a vehicle, and a floating caliper assembly 16 having a primary brake actuator 18 and a secondary brake actuator 20. The brake actuators are better seen in FIGURE 2. The cylinder 22 and piston 24 form a part of the caliper assembly 16 and also constitute the primary brake actuator 18. The caliper assembly further includes a brake shoe assembly 26 including a backing plate 28 and a brake pad or lining 30 which frictionally engages one side of the disc 12. The shoe assembly 26 is movably mounted in the caliper assembly. A similar shoe assembly 32 is mounted on the other side of the disc 12 and is suitably secured to the caliper so that its lining engages the other side of disc 12 when the brake is actuated. Therefore, shoe assembly 32 moves with the caliper in its braking action. The caliper is suitably mounted by means of mounting structure 34 to the axle housing 36, and the disc 12 and wheel 14 are suitably mounted on the axle 38.

The secondary brake actuator assembly 20 includes a bushing 40 which is axially and rotatably mounted in a portion of the housing 42 of the caliper assembly 16 so that it is adjacent the primary brake actuator assembly 18 and its axis is parallel to the axis of rotation of the disc 12. Bushing 40 is internally threaded at 44, has a shoulder 46 formed on the end thereof extending toward the brake shoe 26, and threadedly receives a rod 48 therethrough. The end 50 of the rod 48 is aligned for engagement with the backing plate 28 of the shoe assembly 26. The other end 52 of the rod 48 extends through bushing 40 and into the ratchet chamber 54 formed as a part of the caliper housing 42. A ratchet assembly 56 is mounted in chamber 54 and associated with the end 52 of the rod 48. The ratchet assembly includes a ratchet wheel 58 which is slidably and nonrotatably mounted on rod end 52. As can be seen in FIGURES 1, 2 and 5, rod end 52 may have one or more flats accommodating such a mounting. The ratchet spring pawl 60 is mounted in a part of the caliper housing 42 and is apertured at 62 so that it is received over the teeth 64 of the ratchet wheel 58. As can be seen in FIGURE 1, when the wheel 58 is rotated counterclockwise, the spring pawl 60 permits wheel rotation. However, when the wheel is rotated clockwise, rotation is permitted only to the extent that the next tooth on the wheel engages the pawl in such a manner as to prevent further rotation of the wheel and of rod 48. As will be described below, the counterclockwise movement as seen in FIGURE 1 is a brake applying movement, and the clockwise movement is a brake retracting and adjusting movement.

The end of bushing 40 having a shoulder 46 thereon also has a lever 66 secured thereto by which the bushing may be rotated in both the brake applying and brake retracting directions by appropriate force being exerted through the clevis 68 and other commonly utilized brake linkage associated therewith. A cam 70 is also secured to bushing 40, adjacent lever 66 and intermediate the lever and the caliper housing 42. The cam construction is best seen in FIGURES 3 and 4. Cam guides or followers 72 are secured to the caliper housing and engage the cam surfaces 74 formed on cam 70. In the particular embodiment illustrated, four such cam followers and cam surfaces are utilized. As can be seen in the drawings, movement of the lever 66 in the brake apply direction will result in cam action so that the bushing 46 is moved toward disc 12 in addition to being rotated, and rod 48 is moved in the same direction in unison with the bushing. Sufficient movement of bushing 40 and rod 48 causes the brake to be applied by moving the shoe pad 30 into contact with the disc 12. Since a floating caliper arrangement is utilized, the caliper will move to bring shoe assembly 32 into engagement with the disc. The movement of bushing 40 relative to the caliper housing in the brake applying direction is yieldably opposed by spring 76 engaging the housing 42 and a spring retainer 78 mounted on the end of the bushing adjacent the ratchet assembly 56. Thus spring 76 is compressed as bushing 40 and rod 48 move in the brake applying direction. The lead or helix of the cam 70 is greater than the lead or helix of the internal threads 44 of the bushing and the mating external threads of rod 48. A drive element 80, which is preferably a construction including friction means made of a plug of suitable resilient material located in a hole extending normally of and through the axis of rod 48 engages the internal threads 44 of the bushing 40, thereby interconnecting these concentrically threaded elements. Thus the drive means 80 assists in the movement in unison of bushing 40 and rod 48 when the bushing is rotated in the brake apply direction, as does the relative leads of the cam 70 and the bushing threads.

Upon brake release the bushing 40 is rotated in the brake retracting direction, which is clockwise as seen in FIGURES 1 and 4, and the cam 70 allows movement of the bushing 40 and the rod 48 in the brake release direction. At least part of this rotary force is supplied by spring 76. Since ratchet wheel 58 is nonrotatably secured to the rod end 52, it must therefore rotate with the rod. However, the spring pawl 60 of the ratchet assembly will permit only so much rotation of rod 48 and wheel 58 as is required to lock the pawl against a tooth of the wheel. At this point further wheel rotation and therefore further rotation of rod 48 will be prevented. As the bushing 40 continues to rotate in the brake retracting direction, the drive element 80 slips and the rod 48 is advanced axially by means of the threads 44 toward the brake shoe assembly 26 relative to the bushing. Since the bushing advance, set by the lead of helix or cam 70, is greater than the movement of the rod 48, the rod will still be axially retracted, but by a lesser amount than will be the bushing. Thus each time the angular motion of the lever 66 and the bushing 40 required to actuate the brake exceeds the angular pitch of the ratchet assembly, the rod 48 is advanced in the bushing. Subsequently the rod and bushing do not move relative to each other until the angular motion of the bushing again exceeds the angular pitch of the ratchet tooth. The rod is then again relatively advanced. The brake adjustment is therefore maintained by use of different helical motions and a ratchet take-up.

Should the secondary brake actuator assembly be used infrequently compared to the service brake usage, the brake pads or linings may be worn considerably between secondary brake actuator applications so that the total advance provided by the bushing advance means, including cam 70, in its complete stroke may be insufficient to cause the rod 48 to apply sufficient pressure to achieve a parking or emergency grip on the disc, or to permit the rod to contact the backing plate of the shoe assembly. Under these circumstances, repetitive sequential operation of the secondary brake actuating mechanism will permit the ratchet means to take up the extra clearance and again achieve a properly adjusted brake position.

What is claimed is:

1. In a disc brake mechanism having a disc and a caliper and a shoe and a primary brake actuator,
a self adjusting secondary brake actuator comprising:
a pair of concentrically threaded elements rotatably supported by said caliper one of which is engageable with said shoe,
first means rotating and axially advancing said elements in unison in one direction to apply said shoe to said disc in braking relation and rotating and axially retracting said elements in the other direction to permit retraction of said shoe from said disc,
and second means actuated upon a predetermined rotation of said elements in said other direction inhibiting the further rotation of one of said elements in said other direction to cause a differential rotation between said concentrically threaded elements, thereby adjusting said secondary brake actuator.

2. The mechanism of claim 1, said first means including a cam and cam follower respectively secured to one of said elements and said caliper.

3. The mechanism of claim 1, said second means including a ratchet interconnecting said caliper and said one element and acting on said one element, said ratchet permitting rotation and advancement of said one element in unison with the other of said elements in the direction to apply said shoe.

4. The mechanism of claim 1, further comprising means interconnecting said elements in drive relation and operable upon actuation of said second means to permit relative movement between said elements.

5. The mechanism of claim 1, said first means including a rotary drive for the outer one of said concentrically threaded elements and controlled friction means drivingly connecting said elements and slipping upon actuation of said second means to permit relative movement between said elements.

6. The mechanism of claim 1, the lead of the threads joining said threaded elements being of the same hand but having less lead than the lead of said first means.

7. The mechanism of claim 1, said first means including a cam arrangement having a predetermined hand and lead and operative between said caliper and the concentrically outer one of said elements, the threads joining said elements and controlled friction means drivingly connecting said elements, said controlled friction means slipping upon actuation of said second means to permit relative movement between said elements, said threads joining said elements being of the same hand but lesser lead than said cam arrangement.

References Cited

UNITED STATES PATENTS 3,155,194  11/1964  Gancel _____ 188—73
3,243,016   3/1966  Swift _____ 188—73

DUANE A. REGER, *Primary Examiner.*

G. E. A. HALVOSA, *Assistant Examiner.*